(12) United States Patent
Ishiguro

(10) Patent No.: US 11,085,326 B2
(45) Date of Patent: Aug. 10, 2021

(54) GAS TURBINE HOT PART AND GAS TURBINE

(71) Applicant: MITSUBISHI HEAVY INDUSTRIES, LTD., Tokyo (JP)

(72) Inventor: Tatsuo Ishiguro, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/345,879

(22) PCT Filed: Nov. 29, 2017

(86) PCT No.: PCT/JP2017/042745
§ 371 (c)(1),
(2) Date: Apr. 29, 2019

(87) PCT Pub. No.: WO2018/101303
PCT Pub. Date: Jun. 7, 2018

(65) Prior Publication Data
US 2019/0249567 A1 Aug. 15, 2019

(30) Foreign Application Priority Data
Nov. 30, 2016 (JP) .............................. JP2016-232045

(51) Int. Cl.
*F01D 25/12* (2006.01)
*F01D 5/18* (2006.01)
(Continued)

(52) U.S. Cl.
CPC .............. *F01D 25/12* (2013.01); *F01D 5/18* (2013.01); *F01D 5/183* (2013.01); *F01D 9/02* (2013.01);
(Continued)

(58) Field of Classification Search
CPC . F01D 25/12; F01D 9/02; F01D 25/00; F01D 5/183; F01D 5/18; F01D 25/14;
(Continued)

(56) References Cited

U.S. PATENT DOCUMENTS 6,443,700 B1 * 9/2002 Grylls ..................... F01D 5/182
416/229 R
6,511,762 B1 * 1/2003 Lee ......................... B32B 18/00
428/697

(Continued)

FOREIGN PATENT DOCUMENTS

JP  2001-179028   7/2001
JP  2008-32014    2/2008
(Continued)

OTHER PUBLICATIONS

International Search Report dated Jan. 9, 2018 in International (PCT) Patent Application No. PCT/JP2017/042745, with English Translation.
(Continued)

*Primary Examiner* — J. Todd Newton
(74) *Attorney, Agent, or Firm* — Wenderoth, Lind & Ponack, L.L.P.

(57) ABSTRACT

A gas turbine hot part includes: a body portion; a porous portion forming at least a part of the body portion or disposed on at least a part of the body portion and allowing a cooling gas to pass therethrough; and at least one filter disposed upstream of the porous portion in a flow direction of the cooling gas and capable of trapping foreign substances that cannot pass through the porous portion.

12 Claims, 12 Drawing Sheets

(51) Int. Cl.
 *F01D 25/14* (2006.01)
 *F01D 9/04* (2006.01)
 *F02C 7/18* (2006.01)
 *F01D 9/02* (2006.01)
 *F01D 25/00* (2006.01)
 *B33Y 80/00* (2015.01)
 *B32B 3/26* (2006.01)

(52) U.S. Cl.
 CPC ............. *F01D 9/041* (2013.01); *F01D 25/00* (2013.01); *F01D 25/14* (2013.01); *F02C 7/18* (2013.01); *B32B 3/266* (2013.01); *B33Y 80/00* (2014.12); *F05D 2220/32* (2013.01); *F05D 2240/11* (2013.01); *F05D 2250/60* (2013.01)

(58) Field of Classification Search
 CPC ........ F01D 9/041; F02C 7/18; F05D 2240/11; F05D 2250/60
 USPC .......................................................... 415/115
 See application file for complete search history.

(56) References Cited

U.S. PATENT DOCUMENTS

| | | | | |
|---|---|---|---|---|
| 6,617,003 | B1* | 9/2003 | Lee ....................... | C23C 28/321 428/131 |
| 8,303,247 | B2* | 11/2012 | Schlichting ........... | F01D 11/122 29/424 |
| 8,601,691 | B2* | 12/2013 | Rebak .................... | F01D 5/184 29/889.72 |
| 9,003,657 | B2* | 4/2015 | Bunker .................... | C23C 4/02 29/889.7 |
| 9,421,733 | B2* | 8/2016 | Uskert ..................... | B32B 5/18 |
| 9,447,503 | B2* | 9/2016 | Tholen ................ | C04B 38/0061 |
| 10,598,026 | B2* | 3/2020 | Bunker .................. | F01D 5/147 |
| 10,612,389 | B2* | 4/2020 | Bunker .................. | F23R 3/06 |
| 2003/0021905 | A1* | 1/2003 | Lee ......................... | F01D 5/183 427/402 |
| 2009/0202337 | A1 | 8/2009 | Bosley et al. | |
| 2011/0067378 | A1 | 3/2011 | Tibbott et al. | |
| 2013/0078428 | A1* | 3/2013 | Bunker .................. | F01D 5/147 428/167 |
| 2014/0169943 | A1* | 6/2014 | Bunker .................. | F01D 5/183 415/116 |
| 2019/0249567 | A1* | 8/2019 | Ishiguro ................. | F23R 3/005 |
| 2019/0277143 | A1* | 9/2019 | Ishiguro ................. | F01D 9/04 |

FOREIGN PATENT DOCUMENTS

| | | |
|---|---|---|
| JP | 2014-88872 | 5/2014 |
| JP | 2016-94916 | 5/2016 |

OTHER PUBLICATIONS

International Preliminary Report on Patentability dated Jun. 13, 2019 in corresponding International (PCT) Patent Application No. PCT/JP2017/042745, with English Translation.

* cited by examiner

GAS TURBINE HOT PART AND GAS TURBINE

TECHNICAL FIELD

The present disclosure relates to a gas turbine hot part and a gas turbine.

BACKGROUND ART

A gas turbine includes a compressor, a combustor, and a turbine, where the compressor sucks and compresses air, and the combustor combusts fuel to generate combustion gas with high pressure and high temperature, which rotates the turbine. The output power of the turbine of the gas turbine can produce electricity and thrust.

Gas turbine hot parts such as a combustor, stator vanes, rotor blades, and a ring segment of a turbine are exposed to hot combustion gas and cooled by cooling air.

For instance, a component applicable to a gas turbine disclosed in U.S. Pat. No. 9,003,657 B includes a substrate having cooling air supply holes and a porous layer formed on the substrate. The porous layer, disposed adjacent to a gas path through which combustion gas flows, is cooled by cooling air supplied through the cooling air supply holes into the layer.

SUMMARY

Problems to be Solved

The gas turbine sucks various foreign substances such as sand grains on the intake of air. Further, an industrial gas turbine has a part formed of a rustable material, so that rust occurs therein.

In the component disclosed in U.S. Pat. No. 9,003,657 B, if foreign substances such as sand grains and rust clog the cooling air supply holes, cooling air is not supplied to a part of the porous layer. Thus, the temperature of the porous layer increases in the vicinity of the cooling air supply holes clogged with foreign substances, and the porous layer is locally overheated.

Even if the porous layer merely constitutes a part of the body portion, when foreign substances adhere to the porous layer, a part of the porous layer in the vicinity thereof is insufficiently cooled, and the porous layer is locally overheated.

In view of the above, an object of at least one embodiment of the present invention is to provide a gas turbine hot part and a gas turbine whereby it is possible to prevent clogging of a porous portion with foreign substances, and it is possible to prevent local overheating of the porous portion.

Solution to the Problems (1) According to at least one embodiment of the present invention, a gas turbine hot part comprises: a body portion; a porous portion forming at least a part of the body portion or disposed on at least a part of the body portion and allowing a cooling gas to pass therethrough; and at least one filter disposed upstream of the porous portion in a flow direction of the cooling gas and capable of trapping foreign substances that cannot pass through the porous portion.

With the above configuration (1), since foreign substances that cannot pass through the porous portion are trapped by the filter, clogging of the porous portion is prevented. Consequently, local overheating of the porous portion is prevented.

(2) In some embodiments, in the above configuration (1), the at least one filter is spaced from the at least part of the body portion.

With the above configuration (2), even if foreign substances clog a part of the filter, cooling gases having passed through a non-clogged part of the filter join together in the space downstream of the filter, and the joined gas is distributed to the porous portion. Thus, by making use of the space to distribute cooling gas, local overheating of the porous portion is prevented.

(3) In some embodiments, in the above configuration (1) or (2), the at least one filter includes a first filter and a second filter, the first filter is capable of trapping foreign substances smaller than those which the second filter is capable of trapping, and the first filter is disposed upstream of the second filter in the flow direction of the cooling gas.

With the above configuration (3), cooling gas flows into the second filter after foreign substances are trapped by the first filter capable of trapping smaller foreign substances. Even if foreign substances clog a part of the first filter, cooling gas having passed through a non-clogged part of the first filter flows into the second filter downstream of the first filter. Since the second filter has a rougher structure than the first filter, cooling gas flowing into the second filter can move in a direction orthogonal to the thickness direction within the second filter. Therefore, even if cooling gas flows into the second filter with a nonuniform distribution, the nonuniform distribution is alleviated or leveled when the cooling gas flows out of the second filter, and the cooling gas is appropriately distributed into the porous portion by the second filter. Thus, by making use of the second filter to distribute cooling gas, local overheating of the porous portion is prevented.

(4) In some embodiments, in the above configuration (1) or (2), the at least one filter includes a first filter and a second filter, the first filter is capable of trapping foreign substances smaller than those which the second filter is capable of trapping, and the first filter is disposed downstream of the second filter in the flow direction of the cooling gas.

With the above configuration (4), after foreign substances are trapped from cooling gas by the second filter, smaller foreign substances are trapped by the first filter. Accordingly, the amount of foreign substances flowing into the first filter is reduced by the second filter, and thus it is possible to elongate the life of the first filter. On the other hand, even if a part of the second filter is clogged, since the second filter has a rougher structure than the first filter, cooling gas can bypass the clogged part of the second filter. As a result, foreign substances are trapped by the second filter and the first filter over a long period, and local overheating of the porous portion is prevented.

(5) In some embodiments, in any one of the above configurations (1) to (4), the porous portion is disposed on the at least part of the body portion, and the at least part of the body portion is provided with a cooling gas supply hole for supplying the cooling gas to the porous portion.

With the above configuration (5), in a case where the filter is disposed upstream of the cooling gas supply hole, foreign substances are trapped by the filter, and clogging of the cooling gas supply hole is prevented. Consequently, local overheating of the porous portion is prevented. On the other hand, in a case where the filter is disposed downstream of the cooling gas supply hole, foreign substances having passed through the cooling gas supply hole are trapped by the filter, and local overheating of the porous portion is prevented. Further, even in a case where the filter is disposed inside the cooling gas supply hole, foreign substances are trapped by the filter, and local overheating of the porous portion is prevented.

(6) In some embodiments, in the above configuration (5), the at least one filter is disposed between the porous portion and the at least part of the body portion.

With the above configuration (6), since the filter is disposed between the porous portion and the body portion, foreign substances having passed through the cooling gas supply hole are trapped by the filter, and local overheating of the porous portion is prevented.

(7) In some embodiments, in the above configuration (5), a cross-sectional area of the cooling gas supply hole decreases toward an outlet in the flow direction of the cooling gas, and the at least one filter is disposed, inside the cooling gas supply hole, on an inlet side of the cooling gas supply hole in the flow direction of the cooling gas.

With the above configuration (7), the cross-sectional area of the cooling gas supply hole decreases toward the outlet in the flow direction of cooling gas; in other words, the inlet of the cooling gas supply hole is wider than the outlet. Thus, even if a part of the filter disposed adjacent to the inlet of the cooling gas supply hole is clogged, cooling gas can pass through the cooling gas supply hole by bypassing the clogged part of the filter. Consequently, clogging of the cooling gas supply hole with foreign substances is prevented, and local overheating of the porous portion is prevented.

(8) In some embodiments, in any one of the above configurations (5) to (7), the body portion is provided with a cavity disposed between the cooling gas supply hole and the porous portion and having a cross-sectional area larger than the cooling gas supply hole.

With the above configuration (8), since the cavity having a cross-sectional area larger than the cooling gas supply hole is disposed between the cooling gas supply hole and the porous portion, it is possible to supply cooling gas to a wide region of the porous portion via the cavity. As a result, even if foreign substances having passed through the cooling gas supply hole adhere to the porous portion, it is possible to supply cooling gas to the porous portion via the vicinity of the foreign substances. Thus, local overheating of the porous portion is prevented.

(9) In some embodiments, in any one of the above configurations (1) to (8), the body portion or the porous portion forms at least a part of a rotor blade, a stator vane, a ring segment, or a combustor.

With the above configuration (9), in the rotor blade, the stator vane, the ring segment, or the combustor as the gas turbine hot part, local overheating of the porous portion is prevented.

(10) According to at least one embodiment of the present invention, a gas turbine comprises the gas turbine hot part described in any one of the above (1) to (9).

With the above configuration (10), since local overheating of the porous portion of the gas turbine hot part is prevented, it is possible to improve reliability of the gas turbine.

Advantageous Effects

According to at least one embodiment of the present invention, there is provided a gas turbine hot part whereby it is possible to prevent clogging of a porous portion with foreign substances, and it is possible to prevent local overheating of the porous portion.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
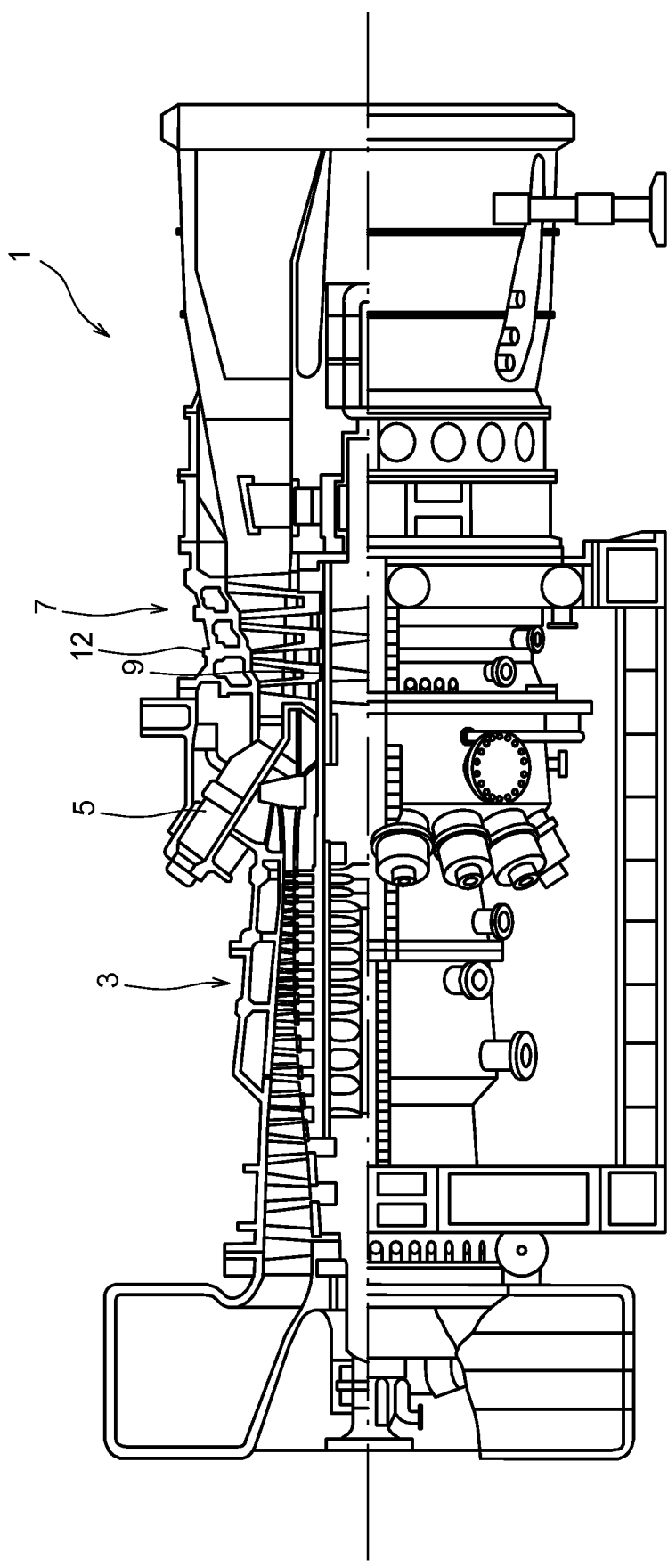
FIG. 1 is a schematic configuration diagram of a gas turbine 1 using a gas turbine hot part according to an embodiment of the present invention.

FIG. 1 is a schematic configuration diagram of a gas turbine 1 using a gas turbine hot part according to an embodiment of the present invention.

As shown in FIG. 1, the gas turbine 1 includes a compressor (compressing part) 3, a combustor (combustion part) 5, and a turbine (turbine part) 7. The compressor 3 sucks and compresses air to produce compressed air. The combustor 5 is supplied with fuel and the compressed air produced in the compressor 3, and combusts the fuel to produce combustion gas having high pressure and high temperature. The turbine 7 rotates a rotational shaft 9 by using combustion gas. The rotational shaft 9 is connected to the compressor 3 and is also connected to a generator (not shown), for instance, so that the compressor 3 is driven by torque output from the rotational shaft 9 while electric power is generated by the generator.

Figure 2:
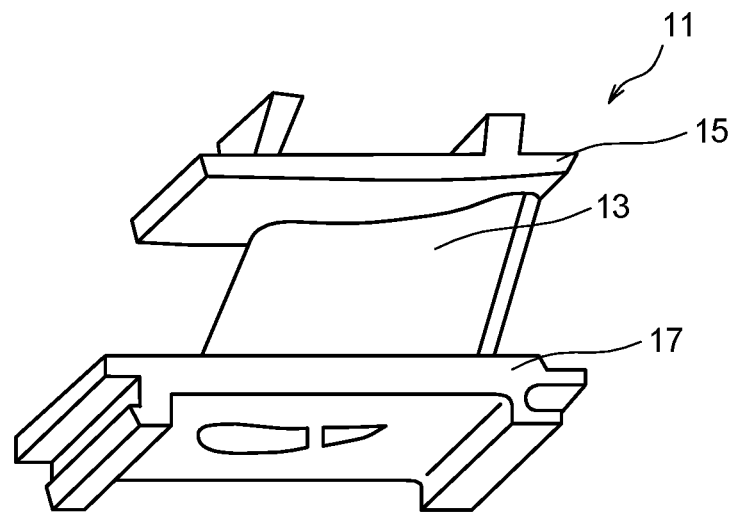
FIG. 2 is a schematic perspective view of a stator vane which can be used in a turbine as a gas turbine hot part according to an embodiment of the present invention.

FIG. 2 is a schematic perspective view of a stator vane 11 which can be used in a turbine 7 as a gas turbine hot part 10 according to an embodiment of the present invention. A plurality of stator vanes 11 are arranged in the circumferential direction of the rotational shaft 9 and fixed to a housing (casing) 12 of the turbine 7. The stator vane 11 includes a blade portion 13, platforms 15, 17 disposed on both sides of the blade portion 13, and a gas path for combustion gas is defined between the platforms 15, 17. Accordingly, surfaces of the platforms 15, 17 and a surface of the blade portion 13 which face the gas path are exposed to combustion gas.

Figure 3:
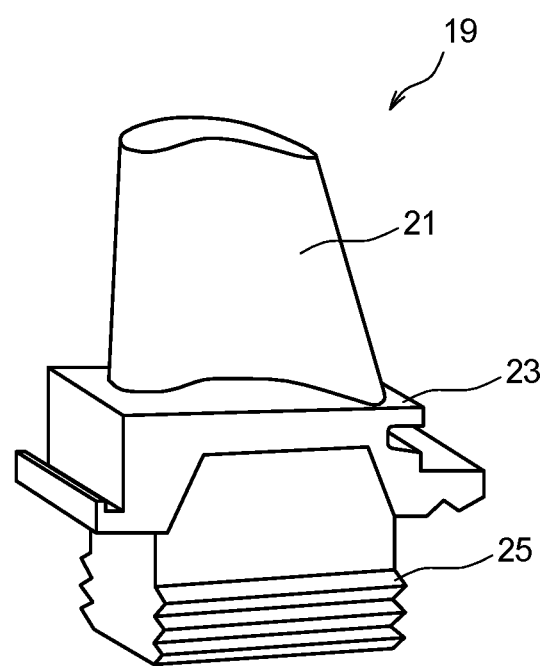
FIG. 3 is a schematic perspective view of a rotor blade which can be used in a turbine as a gas turbine hot part according to an embodiment of the present invention.

FIG. 3 is a schematic perspective view of a rotor blade 19 which can be used in a turbine 7 as a gas turbine hot part 10 according to an embodiment of the present invention. A plurality of rotor blades 19 are arranged in the circumferential direction of the rotational shaft 9 and fixed to the rotational shaft 9. The rotor blade 19 includes a blade portion 21, a platform 23 disposed on one side of the blade portion 21, and a root portion 25 protruding opposite to the blade portion 21 from the platform 23. The root portion 25 is implanted in the rotational shaft 9, and thereby the rotor blade 19 is fixed to the rotational shaft 9. The platform 23 is disposed to cover the rotational shaft 9 and a surface of the platform 23 on a side adjacent to the blade portion 21 defines a gas path. Accordingly, the surface of the platform 23 and a surface of the blade portion 21 which face the gas path are exposed to combustion gas. Combustion gas collides with the blade portions 21 of the rotor blades 19 and rotates the rotational shaft 9.

Figure 4:
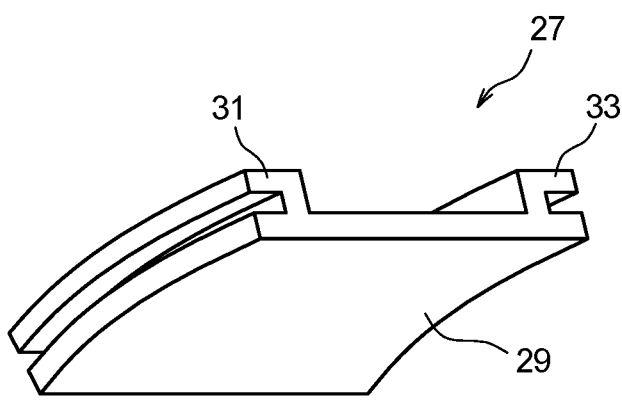
FIG. 4 is a schematic perspective view of a ring segment which can be used in a turbine as a gas turbine hot part according to an embodiment of the present invention.

FIG. 4 is a schematic perspective view of a ring segment 27 which can be used in a turbine 7 as a gas turbine hot part 10 according to an embodiment of the present invention. A plurality of ring segments 27 are arranged in the circumferential direction of the rotational shaft 9 and fixed to the housing 12 of the turbine 7. The ring segments 27 are positioned on an outer side of the rotor blades 19 in the radial direction of the rotational shaft 9, so that the ring segments 27 arranged in the circumferential direction surround the rotor blades 19 arranged in the circumferential direction. The ring segment 27 includes a wall portion 29 forming a surrounding wall around the rotor blades 19 and engagement portions 31, 33 which fixes the wall portion 29 to the housing 12. A surface (concave surface) of the wall portion 29 on a side adjacent to the rotor blade 19 defines a gas path, and the surface of the wall portion 29 which faces the gas path is exposed to combustion gas.

Figure 5:
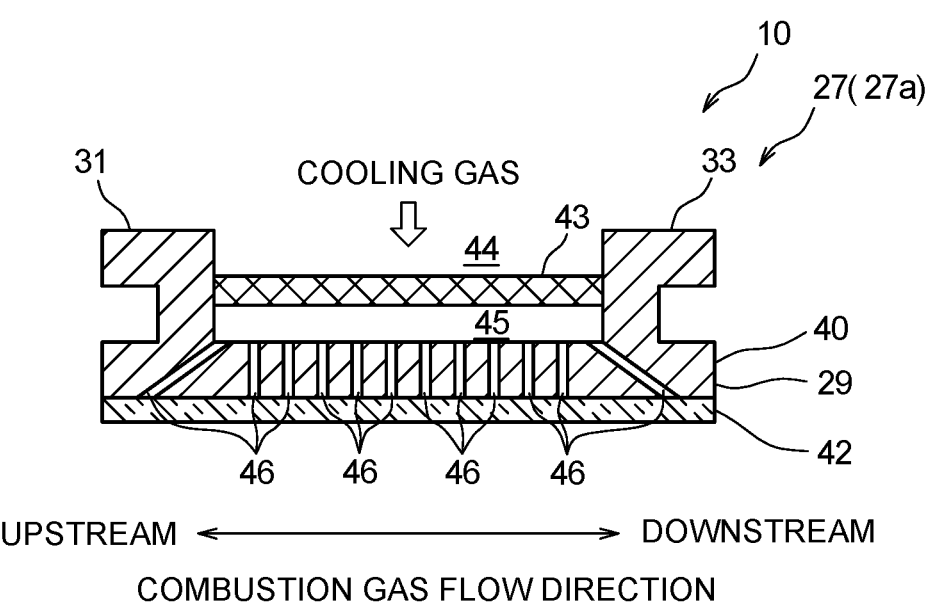
FIG. 5 is a schematic vertical cross-sectional view of a ring segment according to an embodiment of the present invention.
Figure 6:
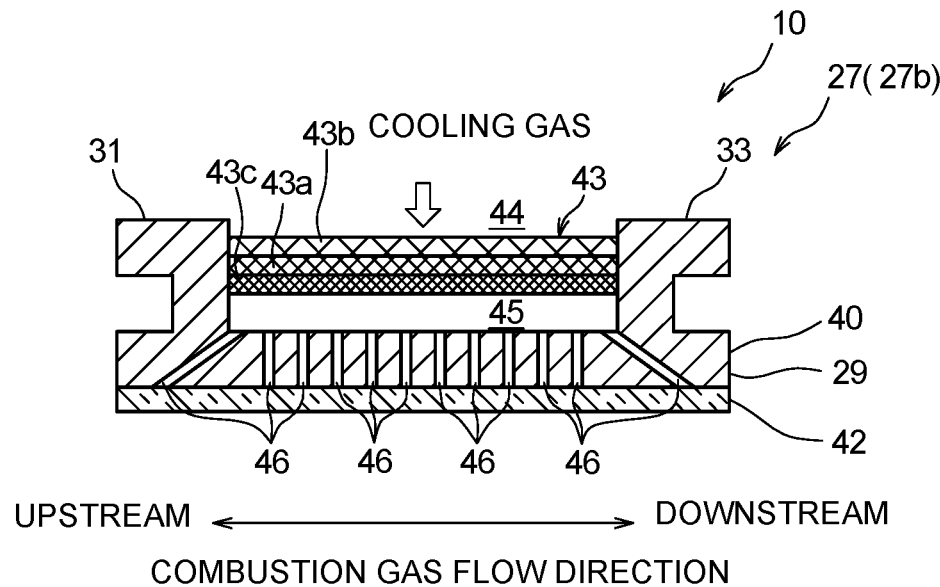
FIG. 6 is a schematic vertical cross-sectional view of a ring segment according to an embodiment of the present invention.
Figure 7:
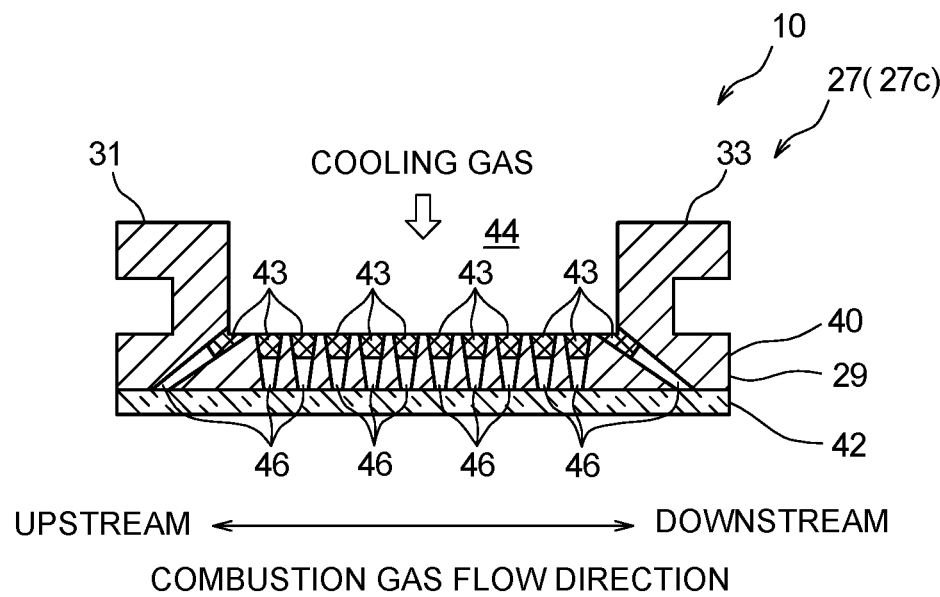
FIG. 7 is a schematic vertical cross-sectional view of a ring segment according to an embodiment of the present invention.
Figure 8:
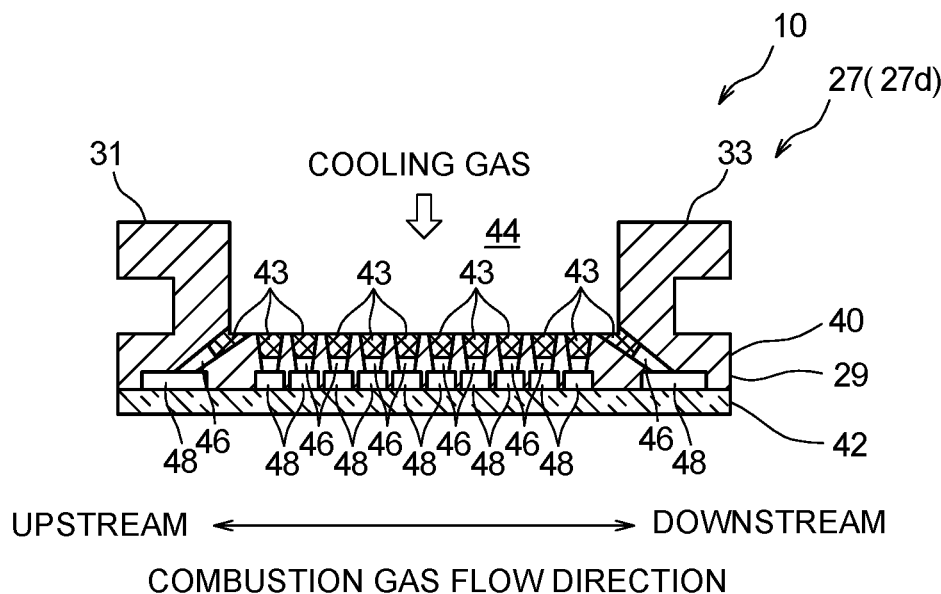
FIG. 8 is a schematic vertical cross-sectional view of a ring segment according to an embodiment of the present invention.
Figure 9:
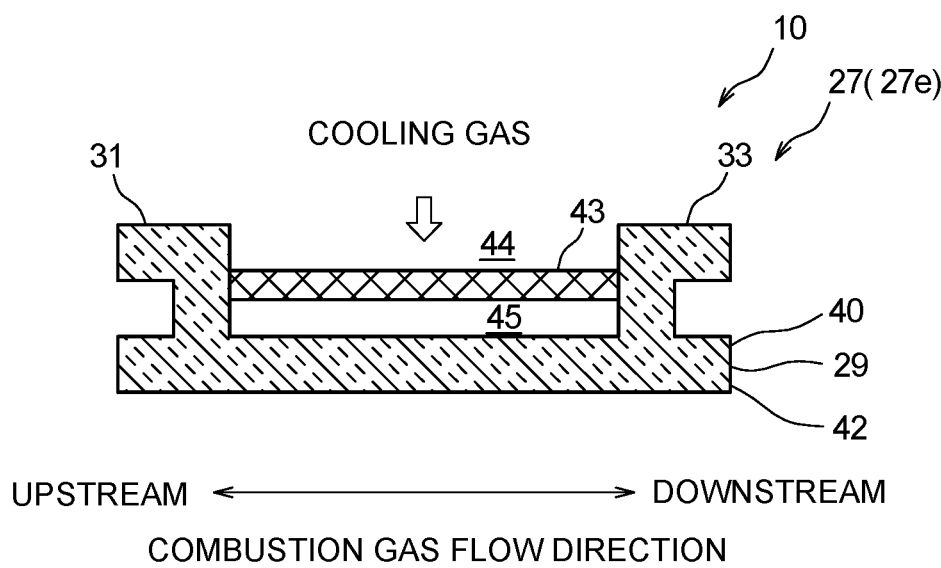
FIG. 9 is a schematic vertical cross-sectional view of a ring segment according to an embodiment of the present invention.
Figure 10:
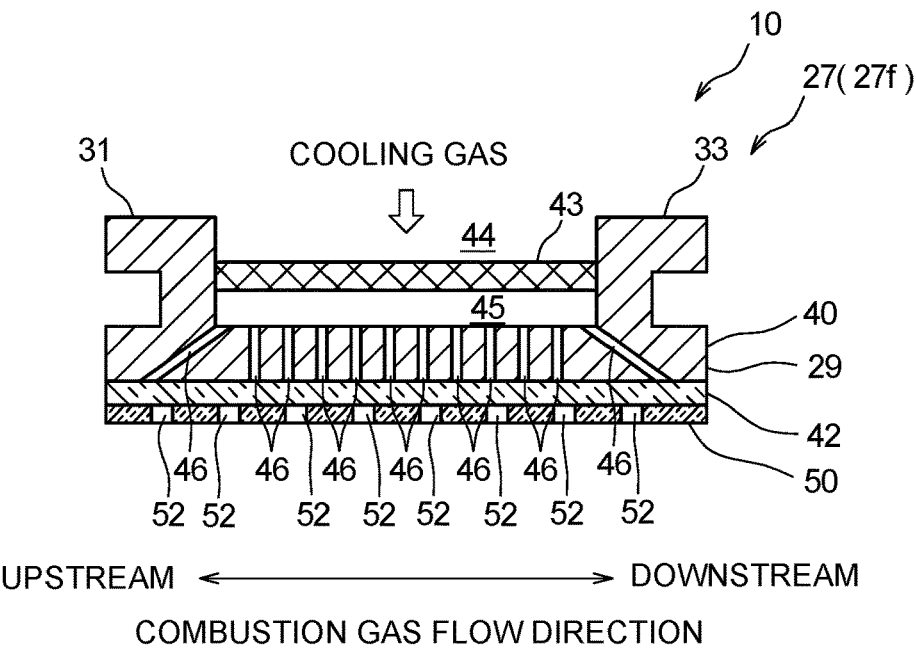
FIG. 10 is a schematic vertical cross-sectional view of a ring segment according to an embodiment of the present invention.
Figure 11:
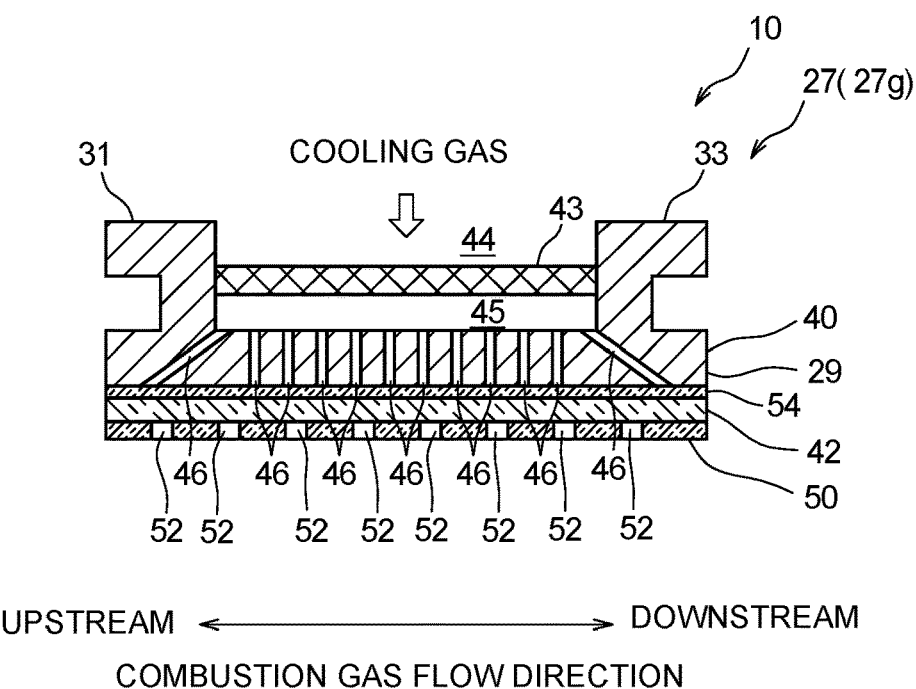
FIG. 11 is a schematic vertical cross-sectional view of a ring segment according to an embodiment of the present invention.
Figure 12:
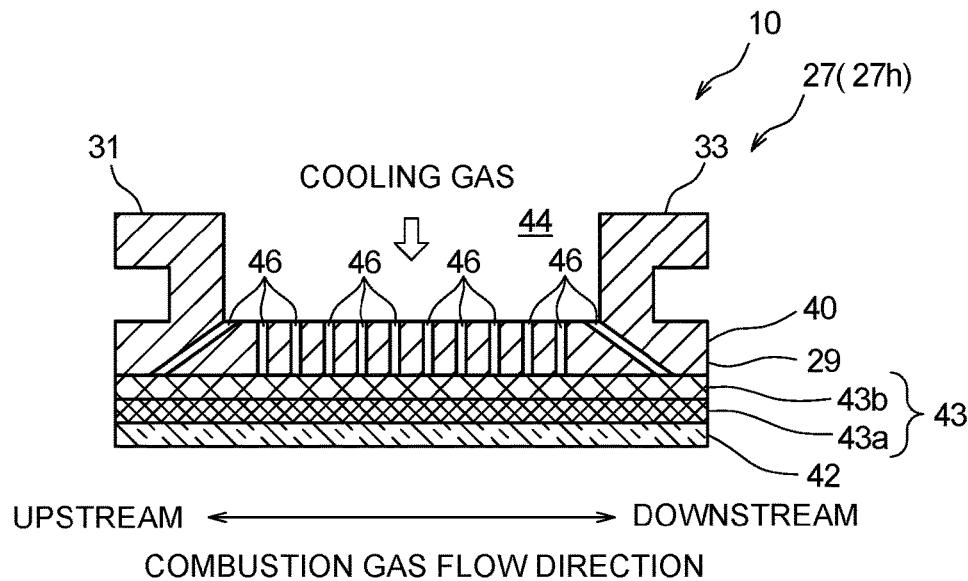
FIG. 12 is a schematic vertical cross-sectional view of a ring segment according to an embodiment of the present invention.
Figure 13:
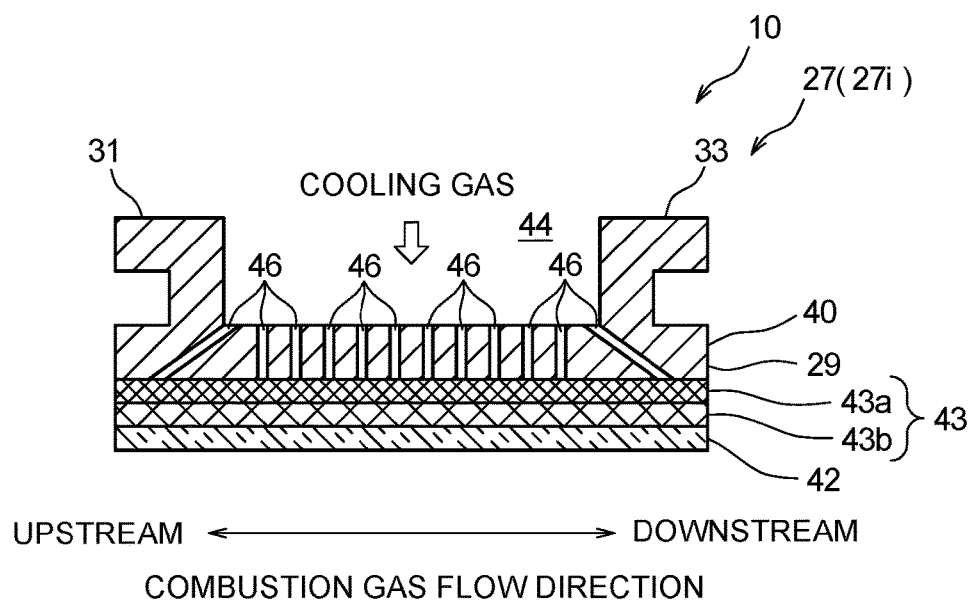
FIG. 13 is a schematic vertical cross-sectional view of a ring segment according to an embodiment of the present invention.
Figure 14:
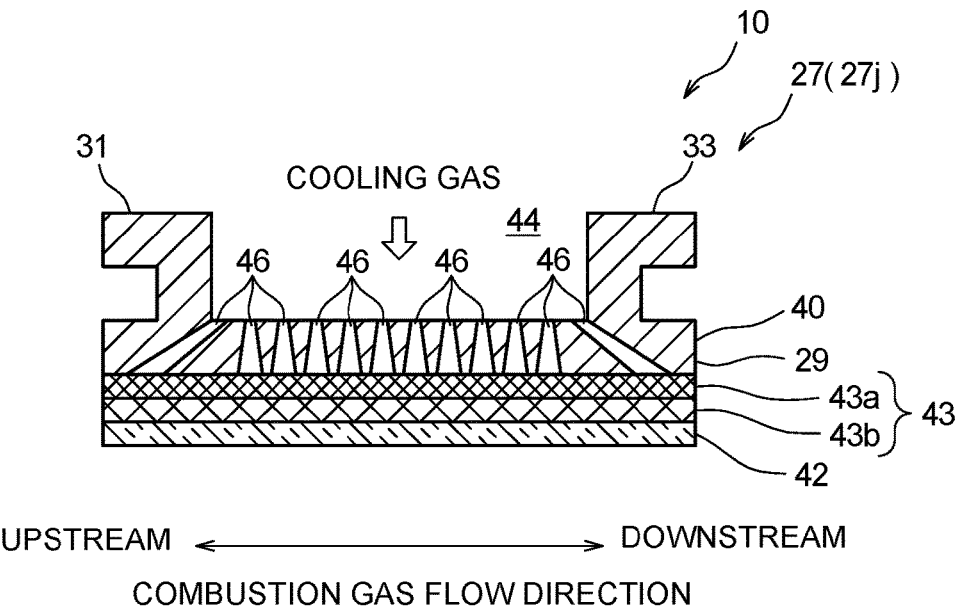
FIG. 14 is a schematic vertical cross-sectional view of a ring segment according to an embodiment of the present invention.
Figure 15:
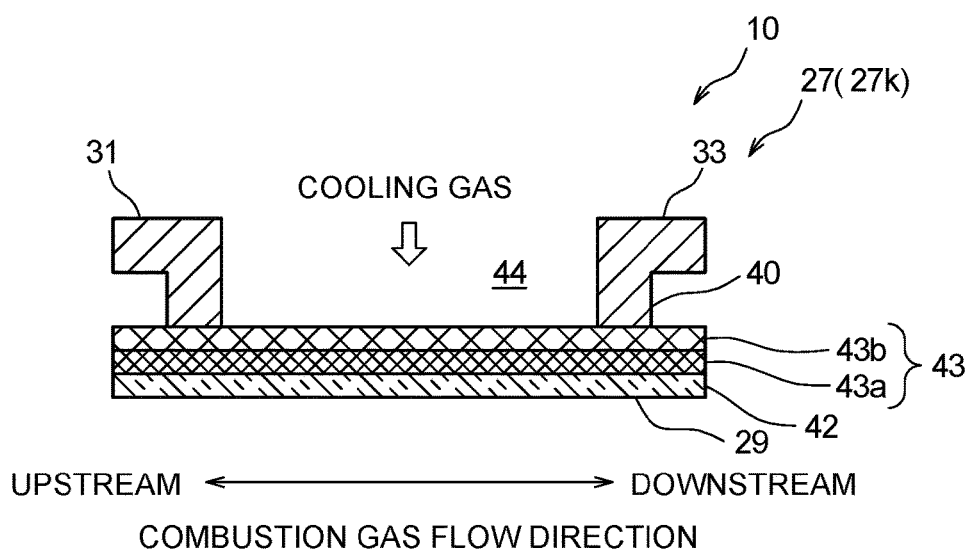
FIG. 15 is a schematic vertical cross-sectional view of a ring segment according to an embodiment of the present invention.
Figure 16:
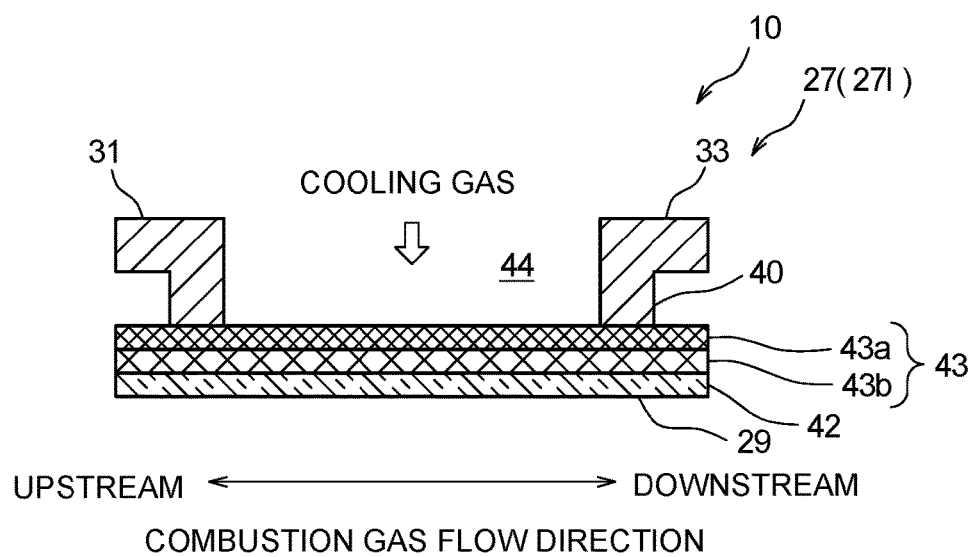
FIG. 16 is a schematic vertical cross-sectional view of a ring segment according to an embodiment of the present invention.

FIG. 5 is a schematic vertical cross-sectional view of a ring segment 27(27a) according to an embodiment of the present invention. FIG. 6 is a schematic vertical cross-sectional view of a ring segment 27(27b) according to an embodiment of the present invention. FIG. 7 is a schematic vertical cross-sectional view of a ring segment 27(27c) according to an embodiment of the present invention. FIG. 8 is a schematic vertical cross-sectional view of a ring segment 27(27d) according to an embodiment of the present invention. FIG. 9 is a schematic vertical cross-sectional view of a ring segment 27(27e) according to an embodiment of the present invention. FIG. 10 is a schematic vertical cross-sectional view of a ring segment 27(27f) according to an embodiment of the present invention. FIG. 11 is a schematic vertical cross-sectional view of a ring segment 27(27g) according to an embodiment of the present invention. FIG. 12 is a schematic vertical cross-sectional view of a ring segment 27(27h) according to an embodiment of the present invention. FIG. 13 is a schematic vertical cross-sectional view of a ring segment 27(27i) according to an embodiment of the present invention. FIG. 14 is a schematic vertical cross-sectional view of a ring segment 27(27j) according to an embodiment of the present invention. FIG. 15 is a schematic vertical cross-sectional view of a ring segment 27(27k) according to an embodiment of the present invention. FIG. 16 is a schematic vertical cross-sectional view of a ring segment 27(27l) according to an embodiment of the present invention.

Figure 17:
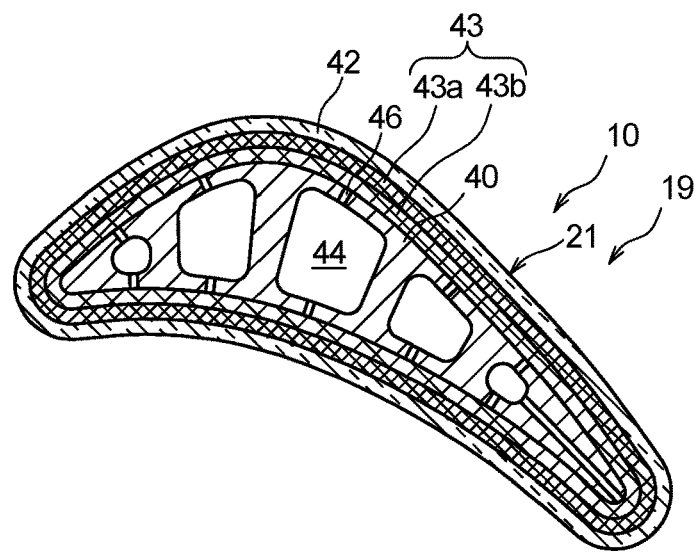
FIG. 17 is a schematic transverse cross-sectional view of a blade portion of a rotor blade according to an embodiment of the present invention.

FIG. 17 is a schematic transverse cross-sectional view of a blade portion 21 of a rotor blade 19 according to an embodiment of the present invention.

Figure 18:
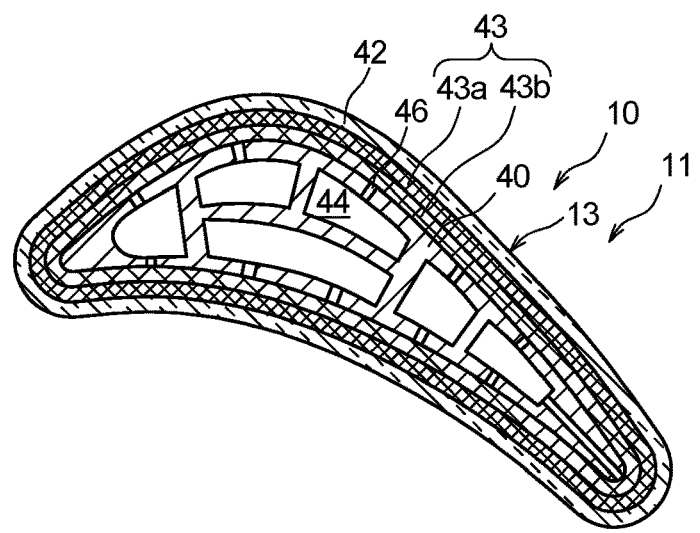
FIG. 18 is a schematic transverse cross-sectional view of a blade portion of a stator vane according to an embodiment of the present invention.

FIG. 18 is a schematic transverse cross-sectional view of a blade portion 13 of a stator vane 11 according to an embodiment of the present invention.

The gas turbine hot part 10 according to at least one embodiment of the present invention includes a body portion 40, a porous portion 42, and at least one filter 43, as shown in FIGS. 5 to 18.

The body portion 40 forms a basic frame of the gas turbine hot part 10, and is made of, for instance, a heat resistant metal such as a Ni-based alloy or a ceramic matrix composite (CMC). The CMC is composed of, for instance, a ceramic fiber such as SiC and $Al_2O_3$ and a ceramic matrix, such as SiC and $Al_2O_3$, covering the ceramic fiber. Between the ceramic fiber and the ceramic matrix, an intermediate layer such as BN is disposed, for instance.

The porous portion 42 forms at least a part of the body portion 40 or is disposed on at least a part of the body portion 40. For instance, in a case where the porous portion 42 forms at least a part of the body portion 40, the porous portion 42 constitutes at least a part of the wall of the gas turbine hot part 10. Alternatively, for instance, in a case where the porous portion 42 is disposed on at least a part of the body portion 40, the porous portion 42 constitutes a coating on the outer surface of the gas turbine hot part 10.

The porous portion 42 has minute pores (not shown), which allow cooling gas to pass through the porous portion 42. That is, the porous portion 42 has a fine cooling structure. The cooling gas is air, for instance. The porous portion 42 is made of, for instance, a foam metal (porous metal) such as NiAl, a ceramic such as porous yttrium-stabilized zirconia, or a porous CMC. For instance, the pores of the porous portion 42 have an equivalent diameter De of several μm or more and several hundred μm or less. The equivalent diameter De is expressed by the following expression: De=4A/L, where A is the cross-sectional area of the pore, and L is the perimeter of the pore. The porous portion 42 may be made by a 3D printer, for instance.

As the filter 43, for instance, a foam metal such as NiAl, a laminate of a wire mesh, or a porous CMC may be used.

The at least one filter 43 is disposed upstream of the porous portion 42 in the flow direction of cooling gas and is capable of trapping foreign substances that cannot pass through the porous portion 42. That is, the filter 43 is capable of trapping foreign substances which causes clogging of the porous portion 42. For instance, the filter 43 has a filtering function capable of trapping foreign substances that clog the pores of the porous portion 42 having an equivalent diameter De of several μm or more and several hundred μm or less.

With respect to the porous portion 42 and the filter 43 through which cooling gas can pass, the passage area of cooling gas in the filter 43 may be sufficiently larger than the passage area of cooling gas in the porous portion 42. In this case, the flow rate of cooling gas passing through the porous portion 42 and the filter 43 is determined mainly in accordance with the passage area of the porous portion 42. For instance, in a case where the passage area of cooling gas in the filter 43 is four times the passage area of cooling gas in the porous portion 42, the flow velocity of cooling gas in the filter 43 is a quarter of the flow velocity of cooling gas in the porous portion 42. Further, since the pressure loss is determined by the square of flow velocity, the pressure loss of the filter 43 is one sixteenth that of the porous portion 42. In this case, the percentage of the pressure loss is 94% for the porous portion 42 and 6% for the filter 43.

Here, if 25% of the passage area of the filter 43 is clogged, the passage area of the filter 43 decreases to three times that of the porous portion 42. In this case, the flow velocity of cooling gas in the filter 43 is one third, and the pressure loss is one ninth. In this case, the percentage of the pressure loss is 90% for the porous portion 42 and 10% for the filter 43. Since the flow rate of cooling gas in the porous portion 42 is proportional to the square root of the pressure loss, in this example, the reduction in flow rate when clogging occurs in 25% of the filter 43 is limited to 2% compared to before clogging occurs. In this way, by appropriately setting the passage areas of cooling gas in the porous portion 42 and in the filter 43, even if clogging occurs in the filter 43, it is possible to suppress the reduction in flow rate of cooling gas, and it is possible to ensure reliability.

At least a part of the porous portion 42 is disposed on a side adjacent to the gas path through which combustion gas flows in the gas turbine hot part 10. The gas turbine hot part 10 has an interior space 44 separated from the gas path by the porous portion 42, and the interior space 44 is supplied with cooling gas having higher pressure than combustion gas flowing through the gas path. The porous portion 42 is cooled by transpiration cooling or microchannel cooling or the like, in which cooling gas passes through the porous portion 42, in accordance with the pressure difference between the static pressure of cooling gas in the interior space 44 and the static pressure of combustion gas in the gas path.

If the pores of the porous portion 42 are clogged with foreign substances and clogging occurs, cooling gas cannot pass through a region where clogging occurs, and this region is overheated.

In this regard, with the above configuration, since foreign substances that cannot pass through the porous portion 42 are trapped by the filter 43, clogging of the porous portion 42 is prevented. Consequently, local overheating of the porous portion 42 is prevented.

In some embodiments, as shown in FIGS. 5, 6, 9, 10, and 11, the at least one filter 43 is spaced from the at least part of the body portion 40 covered with the porous portion 42 with a space (distribution space) 45 being interposed therebetween.

With the above configuration, even if foreign substances clog a part of the filter 43, cooling gases having passed through a non-clogged part of the filter 43 join together in the distribution space 45 downstream of the filter 43, and the joined gas is distributed to the porous portion 42. Thus, by making use of the distribution space 45 to distribute cooling gas, local overheating of the porous portion 42 is prevented.

In this case, for instance, a groove or a slot (not shown) may be provided in the body portion 40, and both ends of the filter 43 having a plate shape may be inserted into the groove or the slot to retain the filter 43. The filter 43 may be fixed by welding or with an adhesive agent or the like, as needed.

In some embodiments, as shown in FIGS. 13, 14, and 16, the at least one filter 43 includes a first filter 43a and a second filter 43b.

The first filter 43a is capable of trapping foreign substances smaller than those which the second filter 43b is capable of trapping. Further, the first filter 43a is disposed upstream of the second filter 43b in the flow direction of cooling gas.

With the above configuration, cooling gas flows into the second filter 43b after foreign substances are trapped by the first filter 43a capable of trapping smaller foreign substances. Even if foreign substances clog a part of the first filter 43a, cooling gas having passed through a non-clogged part of the first filter 43a flows into the second filter 43b downstream of the first filter 43a. Since the second filter 43b has a rougher structure than the first filter 43a, cooling gas flowing into the second filter 43b can move in an in-plane direction orthogonal to the thickness direction within the second filter 43b having a layered structure. Therefore, even if cooling gas flows into the second filter 43b with a nonuniform distribution, the nonuniform distribution is alleviated or leveled when the gas flows out of the second filter 43b, and the gas is distributed into the porous portion 42 appropriately by the second filter 43b. Thus, by making use of the second filter 43b to distribute cooling gas, local overheating of the porous portion 42 is prevented.

In some embodiments, as shown in FIGS. 6, 12, 15, 17, and 18, the at least one filter 43 includes a first filter 43a and a second filter 43b.

The first filter 43a is capable of trapping foreign substances smaller than those which the second filter 43b is capable of trapping. Further, the first filter 43a is disposed downstream of the second filter 43b in the flow direction of cooling gas.

With the above configuration, after foreign substances are trapped from cooling gas by the second filter 43b, smaller foreign substances are trapped by the first filter 43a. Accordingly, the amount of foreign substances flowing into the first filter 43a is reduced by the second filter 43b, and thus it is possible to elongate the life of the first filter 43a. On the other hand, even if a part of the second filter 43b is clogged, since the second filter 43b has a rougher structure than the first filter 43a, cooling gas can pass by bypassing the clogged part of the second filter 43b. As a result, foreign substances are trapped by the second filter 43b and the first filter 43a over a long period, and local overheating of the porous portion 42 is prevented.

In some embodiments, as shown in FIG. 6, the at least one filter 43 further includes a third filter 43c, and the third filter is capable of trapping foreign substance smaller than those which the first filter 43a is capable of trapping. Further, the third filter 43c is disposed downstream of the first filter 43a in the flow direction of cooling gas.

With the above configuration, after foreign substances are trapped from cooling gas by the second filter 43b and the first filter 43a, smaller foreign substances are trapped by the third filter 43c. Accordingly, the amount of foreign substances flowing into the third filter 43c is reduced by the second filter 43b and the first filter 43a, and thus it is possible to elongate the life of the third filter 43c. That is, the at least one filter 43 may be composed of a single filter, or may be composed a plurality of filters. The number of filters is not limited to a particular number.

In some embodiments, the equivalent diameter of the flow path (inner flow path) for cooling gas in the first filter 43a is smaller than the equivalent diameter of the inner flow path of the second filter 43b so that the first filter 43a is capable of trapping foreign substances smaller than those which the second filter 43b is capable of trapping.

In some embodiments, the equivalent diameter of the inner flow path of the third filter 43c is smaller than the equivalent diameter of the inner flow path of the first filter 43a so that the third filter 43c is capable of trapping foreign substances smaller than those which the first filter 43a is capable of trapping.

In order for the filter 43 to exhibit a filter function, the equivalent diameter of the internal flow path of the filter 43 is not necessarily smaller than the equivalent diameter of pores (inner flow path) of the porous portion 42. In the case where the equivalent diameter of the inner flow path of the filter 43 is smaller than the equivalent diameter of pores (inner flow path) of the porous portion 42, the filter 43 can exhibit a filtering function, as a matter of course. On the other hand, even in the case where the equivalent diameter of the inner flow path of the filter 43 is larger than the equivalent diameter of pores (inner flow path) of the porous portion 42, the filter 43 can exhibit a filtering function if the inner flow path of the filter 43 is long and winding so that foreign substances is captured by repeated collision in the inner flow path. That is, the filter 43 is designed to be able to trap foreign substances as a whole.

In some embodiments, as shown in FIGS. 5 to 8, 10 to 14, 17, and 18, the porous portion 42 is disposed on at least a part of the body portion 40. The expression "on the body portion 40" means "on the outer surface of the body portion 40", for instance, on the gas path side. Further, a cooling gas supply hole 46 for supplying cooling gas to the porous portion 42 is provided in the at least part of the body portion 40 covered with the porous portion 42.

With the above configuration, in a case where the filter 43 is disposed upstream of the cooling gas supply hole 46, foreign substances are trapped by the filter 43, and clogging of the cooling gas supply hole 46 is prevented. Consequently, local overheating of the porous portion 42 is prevented. On the other hand, in a case where the filter 43 is disposed downstream of the cooling gas supply hole 46, foreign substances having passed through the cooling gas supply hole 46 are trapped by the filter 43, and local overheating of the porous portion 42 is prevented. Further, even in a case where the filter 43 is disposed inside the cooling gas supply hole 46, foreign substances are trapped by the filter 43, and local overheating of the porous portion 42 is prevented.

In some embodiments, as shown in FIGS. 12 to 14, 17, and 18, the at least one filter 43 is disposed between the porous portion 42 and the at least part of the body portion 40. That is, the filter 43 is sandwiched between the porous portion 42 and the body portion 40.

With the above configuration, since the filter 43 is disposed between the porous portion 42 and the body portion 40, foreign substances having passed through the cooling gas supply hole 46 are trapped by the filter 43, and local overheating of the porous portion 42 is prevented.

In this case, for instance, the filter 43 may be fixed to the body portion 40 by welding or with an adhesive agent, and the porous portion 42 may be formed on the filter 43. Alternatively, the body portion 40 and the filter 43 may be bonded by welding or with an adhesive agent, and the filter 43 and the porous portion 42 may be bonded with an adhesive agent. Alternatively, as described below, the filter 43 and the porous portion 42 may be formed into an integral unit, and the integral unit may be fixed to the body portion 40.

In some embodiments, as shown in FIGS. 7 and 8, the cross-sectional area (flow path area) of the cooling gas supply hole 46 decreases toward the outlet in the flow direction of cooling gas. For instance, the cooling gas supply hole 46 has a truncated cone shape. Further, the at least one filter 43 is disposed, inside the cooling gas supply hole 46, on the inlet side of the cooling gas supply hole 46 in the flow direction of cooling gas.

With the above configuration, the cross-sectional area of the cooling gas supply hole 46 decreases toward the outlet in the flow direction of cooling gas; in other words, the inlet of the cooling gas supply hole 46 is wider than the outlet. Thus, even if a part of the filter 43 disposed on the inlet side of the cooling gas supply hole 46 is clogged, cooling gas can pass through the cooling gas supply hole 46 by bypassing the clogged part of the filter 43. Consequently, clogging of the cooling gas supply hole 46 with foreign substances is prevented, and local overheating of the porous portion 42 is prevented.

In this case, for instance, the filter 43 may be fixed to the body portion 40 by welding or with an adhesive agent.

In some embodiments, the body portion 40 is provided with a cavity 48 disposed between the cooling gas supply hole 46 and the porous portion 42 and having a cross-sectional area larger than the cooling gas supply hole 46.

With the above configuration, since the cavity 48 having a cross-sectional area larger than the cooling gas supply hole 46 is disposed between the cooling gas supply hole 46 and the porous portion 42, it is possible to supply cooling gas to a wide region of the porous portion 42 via the cavity 48. As a result, even if foreign substances having passed through the cooling gas supply hole 46 adhere to the porous portion 42, it is possible to supply cooling gas to the porous portion 42 via the vicinity of the foreign substances. Thus, local overheating of the porous portion 42 is prevented.

The cavity 48 has a cylindrical shape or a prismatic shape coaxial with the cooling gas supply hole 46, for instance. Alternatively, the cavity 48 may have a groove shape or a channel shape extending along the porous portion 42.

In some embodiments, the cavity 48 is formed so that the cross-sectional area of the cavity 48 is as large as possible.

In some embodiments, the cavity 48 is formed so that the cross-sectional area of a wall separating adjacent cavities 48 is as thin as possible.

In some embodiments, as shown in FIG. 9, the porous portion 42 may form the whole of the body portion 40 of the gas turbine hot part 10.

In this case, for instance, a groove or a slot may be provided in the porous portion 42 constituting the body portion 40, and an end portion of the filter 43 may be inserted into the groove or the slot to retain the filter 43. The filter 43 may be fixed by welding or with an adhesive agent or the like, as needed.

In some embodiments, as shown in FIGS. 15 and 16, the porous portion 42 and the filter 43 may form a part of the body portion 40.

In this case, for instance, the filter 43 may be fixed to a remaining part of the body portion 40 by welding or with an adhesive agent or the like, and the filter 43 and the porous portion 42 may be bonded by welding or with an adhesive agent or the like. Alternatively, as described below, the porous portion 42 and the filter 43 may be formed into an integral unit, and the integral unit may be fixed to the remaining part of the body portion 40.

In some embodiments, as shown in FIGS. 10 and 11, a thermal barrier coating (TBC) 50 may be disposed on the porous portion 42. The thermal barrier coating 50 is made of, for instance, a ceramic such as yttrium-stabilized zirconia, and has a smaller porosity than the porous portion 42. The thermal barrier coating 50 may be formed with a cooling gas discharge hole 52 through which cooling gas flows out.

In some embodiments, as shown in FIG. 11, an adhesive layer (intermediate layer) 54 may be disposed between the body portion 40 and the porous portion 42. The adhesive layer 54 bonds the body portion 40 to the porous portion 42, and is made of a calcined aluminum phosphate or a MCrAlY alloy, for instance. M of the MCrAlY alloy represents one or two or more elements selected from the group consisting of Ni, Co, and Fe. The MCrAlY alloy has a composition represented by Co-32Ni-21Cr-8Al-0.5Y, for instance.

In some embodiments, as shown in FIG. 14, the cross-sectional area (flow path area) of the cooling gas supply hole 46 may decrease toward the outlet in the flow direction of cooling gas. For instance, the cooling gas supply hole 46 may have a truncated cone shape.

In some embodiments, as shown in FIGS. 5 to 16, the porous portion 42 is disposed at least on the outer surface side (gas path side) of the wall portion 29 of the ring segment 27.

In some embodiments, as shown in FIG. 17, the porous portion 42 is disposed at least on the outer surface side (gas path side) of the blade portion 21 of the rotor blade 19.

In some embodiments, as shown in FIG. 18, the porous portion 42 is disposed at least on the outer surface side (gas path side) of the blade portion 13 of the stator vane 11.

While in the above embodiments, at least a part of the ring segment 27, the rotor blade 19, or the stator vane 11 is formed by the body portion 40 or the porous portion 42 as the gas turbine hot part 10, in some embodiments, the gas turbine hot part 10 is the combustor 5, as shown in FIG. 1. In this case, the body portion 40 or the porous portion 42 forms at least a part, such as a combustion liner or a transition piece, of the combustor 5.

With the above configuration, in the combustor 5 as the gas turbine hot part 10, local overheating of the porous portion 42 is prevented, as well as the rotor blade 19, the stator vane 11, or the ring segment 27.

Figure 19:
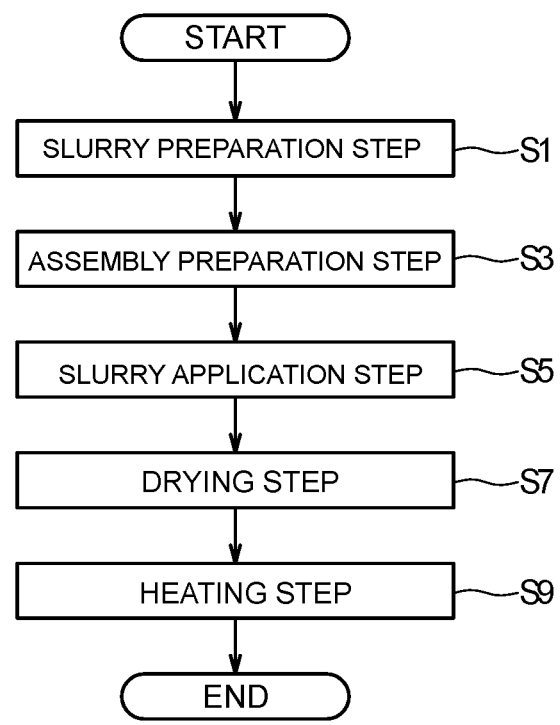
FIG. 19 is a flowchart schematically showing an example of procedure of a method for producing a porous portion used in a gas turbine hot part according to an embodiment of the present invention.

FIG. 19 is a flowchart schematically showing an example of procedure of a method for producing a porous portion used in the gas turbine hot part 10 according to an embodiment of the present invention.

The method for producing a porous portion includes, as shown in FIG. 19, a slurry preparation step S1, an assembly preparation step S3, a slurry application step S5, a drying step S7, and a heating step S9.

In the slurry preparation step S1, water as a solvent, such as distilled water or deionized water, ceramic powder, pore forming powder, a dispersant as required, and a binder as necessary are prepared as raw materials of slurry. The raw materials are then stirred and mixed to prepare slurry.

The ceramic powder is powder including one or more members selected from the group consisting of SiC, $Si_3N_4$, βSiAlON, AlN, $TiB_2$, BN, and WC, or a raw material thereof, for instance.

The pore forming powder is powder including one or more members selected from the group consisting of organic materials, carbon, and graphite. Examples of the organic material powder include polymeric powder such as acrylic powder, styrene powder, and polyethylene powder.

The dispersant includes one or more members selected from the group consisting of ammonium polycarboxylates, sodium polycarboxylates, polyphosphoric acid amino alcohol neutralized products, ammonium salts of naphthalene-sulfonic acids, alkylamine salts of polycarboxylic acids, nonionic surfactants, and cationic surfactants, for instance.

The binder includes one or more members selected from the group consisting of polyvinyl alcohol resins, acrylic resins, and paraffin, for instance.

In the assembly preparation step S3, an assembly of ceramic fibers is prepared. The assembly of ceramic fibers is a bundle or fabric of ceramic fibers. The ceramic powder includes one or more members selected from the group consisting of SiC, SiTiCO, SiZrCO, SiAlCO, and $Si_3N_4$, or a raw material thereof, for instance.

In the slurry application step S5, the slurry is applied to the assembly of ceramic fibers. At this time, the slurry is applied to the assembly of ceramic fibers so that the slurry penetrates into gaps between ceramic fibers.

For instance, in the slurry application step S5, the assembly of ceramic fibers is immersed in the slurry at a pressure lower than atmospheric pressure. Alternatively, the assembly of ceramic fibers is coated with the slurry and then rolled to apply the slurry.

In the drying step S7, the slurry applied to the assembly of ceramic fibers is dried in an atmosphere of 120° C., for instance, to form a green body (intermediate).

In the heating step S9, the green body is heated under a reducing atmosphere at 1200° C., for instance, so that the ceramic powder is sintered and the pore forming powder is removed.

In the above-described method for producing a porous portion, in the slurry preparation step S1, the pore forming powder is mixed in the slurry, and in the heating step S9, the pore forming powder is removed, so that pores corresponding to the pore forming powder is formed in the porous portion.

Further, with the above-described method for producing a porous portion, the porosity can be controlled by adjusting the amount of the pore forming powder to be added to the slurry.

Figure 20:
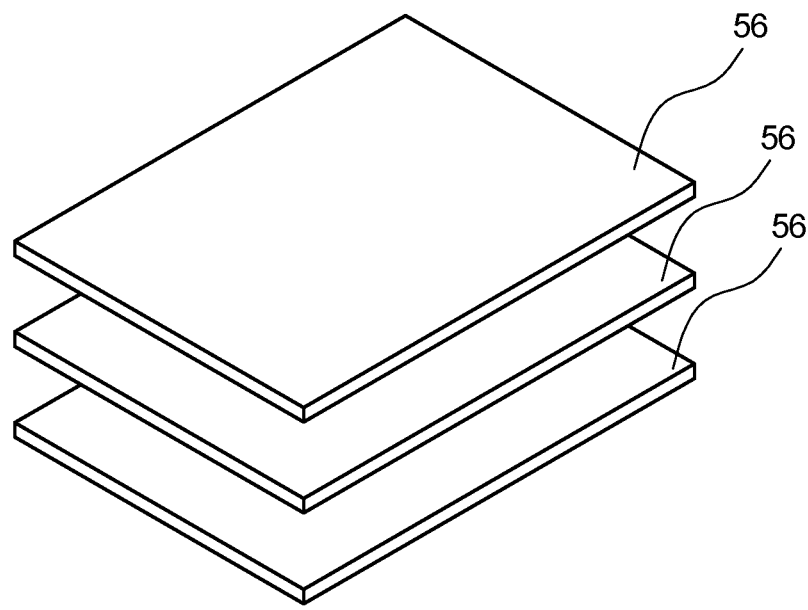
FIG. 20 is a schematic perspective diagram for describing an example of an assembly preparation step and a slurry application step.

FIG. 20 is a schematic perspective diagram for describing an example of the assembly preparation step S3 and the slurry application step S5.

In some embodiments, as shown in FIG. 20, a plurality of fabrics 56 of ceramic fibers are prepared. While slurry is applied to each fabric 56, the content and/or the particle size of the pore forming powder contained in the slurry varies for each fabric 56. To this end, in the slurry preparation step S1, a plurality of slurries containing pore forming powder with different contents and/or different particle sizes are prepared.

Then, the fabrics 56 applied with the slurries are superimposed and dried and heated, whereby it is possible to produce porous portion having different porosities in the thickness direction. Further, a high-porosity layer of the porous portion can be used as the filter. That is, with the above method, it is possible to produce the porous portion and the filter layer integrally. In addition, with the above method, it is also possible to produce the body portion and the filter layer integrally.

Embodiments of the present invention were described in detail above, but the present invention is not limited thereto, and various amendments and modifications may be implemented.

In particular, although the ring segment 27 has been mainly described as the gas turbine hot part 10, the configuration described for the ring segment 27 can also be applied to the combustor 5, the stator vane 11, and the rotor blade 19; and the configuration described for the stator vane 11 can also be applied to the combustor 5, the rotor blade 19, and the ring segment 27, and the configuration described for the rotor blade 19 can also be applied to the combustor 5, the stator vane 11, and the ring segment 27.

Further, the gas turbine hot part 10 is a component at least a part of which is heated to, for instance, 800° C. or higher due to the influence of combustion gas, and is not limited to the combustor 5, the stator vane 11, the rotor blade 19, and the ring segment 27 described above.

REFERENCE SIGNS LIST

1 Gas turbine
3 Compressor
5 Combustor
7 Turbine
9 Rotational shaft
10 Gas turbine hot part
11 Stator vane
12 Housing
13 Blade portion
15, 17 Platform
19 Rotor blade
21 Blade portion
23 Platform
25 Root portion
27 Ring segment
29 Wall portion
31, 33 Engagement portion
40 Body portion
42 Porous portion
43 Filter
44 Interior space
45 Space
46 Cooling gas supply hole
48 Cavity
50 Thermal barrier coating
52 Cooling gas discharge hole
54 Adhesive layer
56 Fabric of ceramic fiber

The invention claimed is:

1. A gas turbine hot part comprising:
a body portion;
a porous portion on at least a part of the body portion, the porous portion being configured to allow a cooling gas to pass therethrough; and
at least one filter upstream of the porous portion in a flow direction of the cooling gas, the at least one filter being capable of trapping substances that cannot pass through the porous portion,
wherein:
a cooling gas supply hole for supplying the cooling gas to the porous portion extends through the at least the part of the body portion from an inlet of the at least the part of the body portion to an outlet of the at least the part of the body portion;
a cross-sectional area of the cooling gas supply hole decreases toward the outlet of the at least the part of the body portion in the flow direction of the cooling gas; and
the at least one filter is inside the cooling gas supply hole at the inlet of the at least the part of the body portion in the flow direction of the cooling gas; and
the at least one filter does not extend to the outlet of the at least the part of the body portion in the flow direction of the cooling gas.

2. The gas turbine hot part according to claim 1, wherein the body portion includes a cavity between the cooling gas supply hole and the porous portion, and the cavity has a cross-sectional area which is larger than the cross-sectional area of the cooling gas supply hole.

3. The gas turbine hot part according to claim 1, wherein the body portion or the porous portion is at least a part of a rotor blade, a stator vane, a ring segment, or a combustor.

4. A gas turbine comprising the gas turbine hot part according to claim 1.

5. The gas turbine hot part according to claim 1, wherein a length of the at least one filter in the flow direction of the cooling gas is shorter than a length of the cooling gas supply hole in the flow direction of the cooling gas.

6. The gas turbine hot part according to claim 1, wherein the porous portion is in contact with the body portion.

7. A gas turbine hot part comprising:
a body portion;
a porous portion on at least a part of the body portion, the porous portion being configured to allow a cooling gas to pass therethrough; and at least one filter upstream of the porous portion in a flow direction of the cooling gas, the at least one filter being capable of trapping substances that cannot pass through the porous portion, wherein:

the at least the part of the body portion includes a cooling gas supply hole for supplying the cooling gas to the porous portion;

the at least one filter is sandwiched between the porous portion and the at least the part of the body portion;

the at least one filter includes a first filter and a second filter, the second filter being downstream of the first filter in the flow direction of the cooling gas; and the first filter is capable of trapping substances smaller than those which the second filter is capable of trapping.

8. The gas turbine hot part according to claim 7, wherein the body portion or the porous portion is at least a part of a rotor blade, a stator vane, a ring segment, or a combustor.

9. A gas turbine comprising the gas turbine hot part according to claim 7.

10. A gas turbine hot part comprising:
a body portion;
a porous portion on at least a part of the body portion, the porous portion being configured to allow a cooling gas to pass therethrough; and
at least one filter upstream of the porous portion in a flow direction of the cooling gas, the at least one filter being capable of trapping substances that cannot pass through the porous portion, wherein:

the at least the part of the body portion includes a cooling gas supply hole for supplying the cooling gas to the porous portion;

the at least one filter is sandwiched between the porous portion and the at least the part of the body portion; and the body portion includes a cavity between the cooling gas supply hole and the porous portion, and the cavity has a cross-sectional area which is larger than a cross-sectional area of the cooling gas supply hole.

11. The gas turbine hot part according to claim 10, wherein the body portion or the porous portion is at least a part of a rotor blade, a stator vane, a ring segment, or a combustor.

12. A gas turbine comprising the gas turbine hot part according to claim 10.

* * * * *